US008745617B1

(12) United States Patent
Stekkelpak et al.

(10) Patent No.: US 8,745,617 B1
(45) Date of Patent: Jun. 3, 2014

(54) MANAGING APPLICATIONS ON A CLIENT DEVICE

(71) Applicant: Google Inc., Mountain View, CA (US)

(72) Inventors: Zoltan Stekkelpak, Sunnyvale, CA (US); Gyula Simonyi, Dublin (IE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/764,005

(22) Filed: Feb. 11, 2013

(51) Int. Cl.
G06F 9/445 (2006.01)

(52) U.S. Cl.
CPC .................................. G06F 8/61 (2013.01)
USPC ............................... 717/178; 717/173

(58) Field of Classification Search
CPC ...................................................... G06F 8/61
USPC ................................. 717/177, 178, 173
See application file for complete search history.

(56) References Cited

U.S. PATENT DOCUMENTS

| 6,931,429 | B2 * | 8/2005 | Gouge et al. ............. 709/203 |
| 7,320,011 | B2 * | 1/2008 | Koskimies ...................... 1/1 |
| 7,703,611 | B1 | 4/2010 | Appelman et al. |
| 7,908,234 | B2 * | 3/2011 | Shao et al. ............... 706/21 |
| 2003/0233383 | A1 * | 12/2003 | Koskimies ............... 707/204 |
| 2007/0294293 | A1 * | 12/2007 | Rosenbloom et al. ..... 707/104.1 |
| 2008/0189170 | A1 | 8/2008 | Ramachandra |
| 2009/0063624 | A1 | 3/2009 | Nordstrom et al. |
| 2009/0112684 | A1 * | 4/2009 | Toomer et al. ............... 705/10 |
| 2010/0130233 | A1 * | 5/2010 | Parker ..................... 455/456.3 |
| 2012/0042036 | A1 * | 2/2012 | Lau et al. .................. 709/217 |
| 2012/0072991 | A1 * | 3/2012 | Belani et al. ............... 726/25 |
| 2012/0110674 | A1 * | 5/2012 | Belani et al. ............... 726/25 |

* cited by examiner

Primary Examiner — Phillip H Nguyen
(74) Attorney, Agent, or Firm — Leydig, Voit & Mayer, Ltd.

(57) ABSTRACT

A system and methods for managing applications on a mobile device. One method includes: receiving context data related to the mobile device; assigning a situational utility score to one or more applications available in an application repository by analyzing the context data and tags associated with the one or more applications to determine which applications have situational usefulness; and when a first application has a situational utility score greater than a first threshold value, displaying a prompt on the mobile device to install the first application.

20 Claims, 10 Drawing Sheets

MANAGING APPLICATIONS ON A CLIENT DEVICE

BACKGROUND

Most people today carry mobile phones that can install separate application or "apps." The proliferation of mobile devices and mobile operating platforms has spread quickly. The app collections and/or app stores connected to these mobile operating platforms continue to expand spectacularly. As a consequence, today there is a dedicated app for many places and situations. However, a large barrier to the usefulness of these apps is discoverability. In an example, although there might be an app for a particular transportation network (e.g., a rail network), if a user trying to travel on this transportation network does not know about the app, then the app cannot create value-add for the user.

Some app stores currently allow for browsing of apps by "category" or by "featured" (or curated) app sections to help discoverability of apps. These solutions are not personalized and are not relevant to the user's immediate situation. Some app repositories also apply recommendation engines that offer apps based on past app purchase history. While these offerings are personalized, they are also not relevant to the user's immediate situation.

SUMMARY

One embodiment provides a method for managing applications on a mobile device. The method includes: receiving context data related to the mobile device; assigning a situational utility score to one or more applications available in an application repository by analyzing the context data and tags associated with the one or more applications to determine which applications have situational usefulness; and when a first application has a situational utility score greater than a first threshold value, displaying a prompt on the mobile device to install the first application.

Another embodiment provides a method for managing applications on a mobile device. The method includes: receiving context data related to the mobile device; assigning a situational utility score to one or more applications available in an application repository by analyzing the context data and tags associated with the one or more applications to determine which applications have situational usefulness; and automatically installing a first application on the mobile device when the first application has a situational utility score greater than a first threshold value.

Yet another embodiment provides a system for managing applications on a mobile device. The system includes one or more databases, a mobile device, and a server. The one or more databases store applications and metadata corresponding to mobile devices and/or users of the mobile devices. The mobile device includes a hardware component configured to detect a location of the mobile device. The server is in communication with the mobile device via a data network, and the server is configured to: receive data related to the location of the mobile device, identify that an application is available to be installed that corresponds to the location of the mobile device, and cause a prompt to be displayed on the mobile device indicating that the application is available to be downloaded.

DETAILED DESCRIPTION

Figure 1:
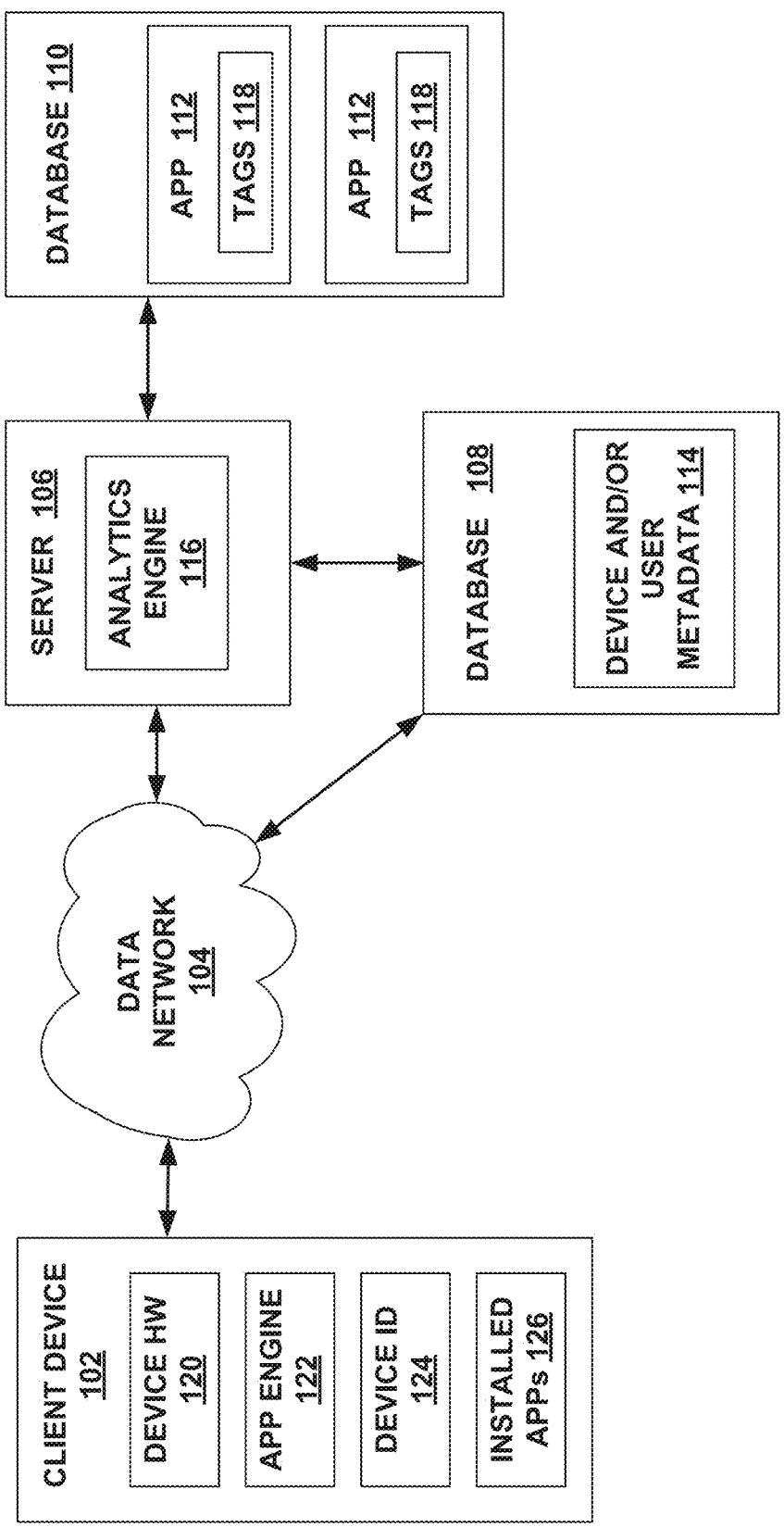
FIG. 1 is a block diagram of an example system for recommending applications for a client device, according to an example embodiment.

Some embodiments of the disclosure provide a technique for helping users find the most useful apps for particular situations, activities, and places. Some embodiments provide a technique for presenting a continuous flow of self-installing and self-uninstalling apps to the user. Still further, some embodiments provide a technique for presenting a timeline of applications to the user, where the user can navigate along a time axis to view currently relevant apps (present), apps that were relevant in previous situations (past), and apps that are likely to be useful in the future based on predicted situations (future). For example, the prediction may be based on the user's context, including calendar events, flight/hotel/restaurant bookings, events in the area of the user's interest, among others.

In some embodiments, as described in greater detail herein, an application is automatically installed, without user interaction, if a situational utility score corresponding to the application passes a certain minimum threshold relative to the user's situation. Also, in some embodiments, an automatically installed application is automatically uninstalled when the situational utility score corresponding to the application decreases under a certain minimum threshold relative to the user's situation (e.g., for a minimum amount of time).

In one implementation, each app in the app store or app repository is marked with various "tags," which represent parameters that detail an application's situational usefulness. In various examples, the tags can be: geographic places, times of day/week/year, various activity types, limits of the geographic area where this app is useful (such as, "New York City," or "Plaza Hotel, New York City"), types or categories of geographic places where an app is useful (such as "parks," "train stations," or "beaches"), limits of a time window when the app is useful (such as "while staying in this hotel," "during this festival," or "the winter months"), qualitative indicators of the user's environment in which the app is useful (such as weather or traffic data), types of activities when the app is useful (such as city transport, running, cooking, driving, etc.), moods of the user in which the app is useful (e.g., busy, playful, playing sports), current and upcoming events for the user in which this app is useful (e.g., running, hiking, travel, wedding, birthdays, holidays, etc.).

In addition, an application's situational usefulness can be further defined by a cloud-based feature that monitors which applications are used in which situations. For example, if a "SkiTahoe app" is used around or near the Northstar Ski Resort mainly in the late afternoon hours, then such use is a strong indication that this app is useful to users around or near the same resort at around the same time. Embodiments of the disclosure, in a real-time and privacy-sensitive way, can analyze each installed app's usage characteristics (e.g., place of use, user situation, time of use, time of the day, user demographics, and other parameters) and detect correlation across these sets of usage data.

Some embodiments provide for maintaining an "app graph," which indicates the similarity of the apps to one another, as well as the strength of the similarity between apps. In one example, the app graph could be based on a recommendation system (e.g., users who installed app "A" also installed app "B"). In another embodiment, based on analyzing that a specific app's usage (or adoption) is prominent in a given scenario, embodiments of the disclosure could push similar apps in similar situations as temporary apps. The platform could also maintain a continuous A/B testing, where distinct apps are pushed to users in similar scenarios and the platform monitors the difference in adoption, usage, and engagement. Higher adoption/usage/engagement indicates higher utility. The A/B testing could also be performed with assigning various weights to the signals, and comparing the adoption/engagement metrics of the outcomes.

In some embodiments, a background feature or daemon (e.g., as part of an operating system) on a client device (e.g., a mobile phone) monitors certain signals on the client device in a real-time and privacy-sensitive manner and updates one or more context parameters that describe a likely situation in which the user and the client device are involved. The user context attempts to answer questions such as "where is this user now" and "what is this user doing here." The user context helps define what apps could be currently useful to the user. Examples of signals used to define the context include: geographic location of the client device (such as "New York City," or "Bus #34 in New York City), information from calendar events (such as people and/or groups to meet or activities planned), information from the user's purchase history (such as hotel bookings), apps currently or recently used (such as a currency exchange calculator app), data from apps recently used (such as the name of the currencies used for calculation), accelerometer and gyroscope reads and patterns to establish current activity, traffic, weather, and other data sources describing the local environment, current/recent user activity on the device (such as photos taken, posts shared on social networks, etc.), and/or explicit input (such as reading a QR (quick response) code or reading an NFC (near field communication) tag). In some embodiments, the monitoring described above can be performed by a stand-alone application dedicated for monitoring such signals.

According to various embodiments, an analytics engine executing on a server monitors matches, and the confidence thereof, between the user context and the situational usefulness of different apps provided in the app repository. In some embodiments, when a confident match is identified, the analytics engine automatically installs the application on the user's mobile device (possibly in a dedicated area for auto-installed apps). In some embodiments, installing the app is not automatic, but the user receives a prompt to install the recommended app. The prompt may also include a message annotated by the app developer describing why this app is being recommended.

In some embodiments, to make the recommended application even more useful to the user, the client device may provide information about the user to the application. For example, the client device may be aware of certain characteristics about the user, such as name, age, birthday, height, dietary restrictions, etc. These characteristics can be provided to the auto-installed application so that the application can use this information to provide recommendations for activities, events, accommodations, catering, price ranges, sizes for bathrobes at a hotel, preference in massage strength, etc.

As an example use case, a user walks into the Plaza Hotel in New York City. The user's mobile phone automatically offers the "Plaza Hotel app" to be installed the user. The user uses the app to orient himself or herself in the hotel and the city, to learn about the offerings of the hotel, to book a dinner table and/or massage, order room service, connect to reception, control the TV and/or lights in the room, gain internet access, etc. When the user checks out of the hotel, the app offers to uninstall itself.

In some embodiments, users may have privacy settings/options of whether their context information, such as location, should be included in the analysis performed to provide recommended apps.

FIG. 1 is a block diagram of an example system for recommending applications for a client device, according to an example embodiment. The system includes a client device 102, a data network 104, one or more servers 106, and databases 108 and 110.

The client device 102 can be any type of computing device, including a personal computer, laptop computer, mobile phone with computing capabilities, or any other type of device. The client device 102 includes, among other things, device hardware 120, a app engine 122, a device identifier (ID) 124, installed application(s) 126, a communications client, output devices (e.g., a display), and input devices (e.g., keyboard, mouse, touch screen), etc. In some embodiments, a client device 102 may act as both an output device and an input device.

Device hardware 120 includes components capable of detecting and/or measuring real-world phenomena at the client device 102, e.g., a GPS (global positioning system) module, an accelerometer, a compass, and/or a light intensity sensor. The app engine 122 is configured to detect the user's context, prompt the user to install recommended applications, automatically install such applications when deemed relevant, and automatically uninstall or prompt to uninstall such applications when no longer deemed relevant. According to various embodiments, the app engine 122 can be implemented in the OS (operating system) of the client device 102 or as a stand-alone application installed on the client device 102. The device ID 124 is a unique identifier corresponding to the client device 102. In some embodiments, the device ID 124 also corresponds to a particular user.

The data network 104 can be any type of communications network, including an Internet network (e.g., wide area network (WAN) or local area network (LAN)), wired or wireless network, or mobile phone data network, among others.

The client device 102 is configured to communicate with a server 106 via the data network 104. In some embodiments, the server 106 includes an analytics engine 116. The server 106 is in communication with databases 108 and 110. In some embodiments, the database 108 stores metadata 114 corresponding to users and/or client devices, and the database 110 comprises an app repository that stores one or more applications 112 that can be installed on the client device 112. Each application 112 is associated with one or more tags 118.

The metadata 114 corresponding to users and/or client devices may include information about individual users and/or client devices, e.g., context data and other info. Examples include: device location, user calendar events, user purchase history, device applications recently used, user and/or device search history, recent user activity, user preferences, emails, text messages, device direction of travel, device speed of travel, among others. In some implementations, user feedback gathered from previous matched situations can be looped back to fortify the confidence in future situational matchings between user context and an app's situational usefulness. User feedback can include accepting installation of an app, declining the offered app, usage intensity on the installed app, user rating on the installed app, and/or user accepting deletion of the app. In some embodiments, the client device 102 is configured to communicate with the database 108 via the data network 104 to provide user and device context to the database 108 to be stored as metadata 114.

In some embodiments, as described in greater detail herein, one or more items of context data may be transmitted from the client device 102 to the server 108 via the network. In some embodiments, the transmission of the context data may be periodic, e.g., every minute. The analytics engine 116 within the server 106 receives the context data from the client device 102 and/or the database 108. The analytics engine 116 analyzes the context data and/or metadata 114 to identify that at least app 112 that may be relevant to the user of the client device 102. The analytics engine 116 transmits a signal to the app engine 122 to prompt the user as to whether the user would like to install a recommended app. If the user selects that the app should be installed, then the app engine 112 retrieves the app from the database 110 and the app is installed on the client device 102. Also, in some embodiments, the user's selection of whether to install the app is transmitted to the database 108 and stored as metadata 114 corresponding to the user and/or device.

In one embodiment, databases 108 and 110 comprise a single database. In another embodiment, databases 108 and 110 comprise separate databases.

Figure 2:
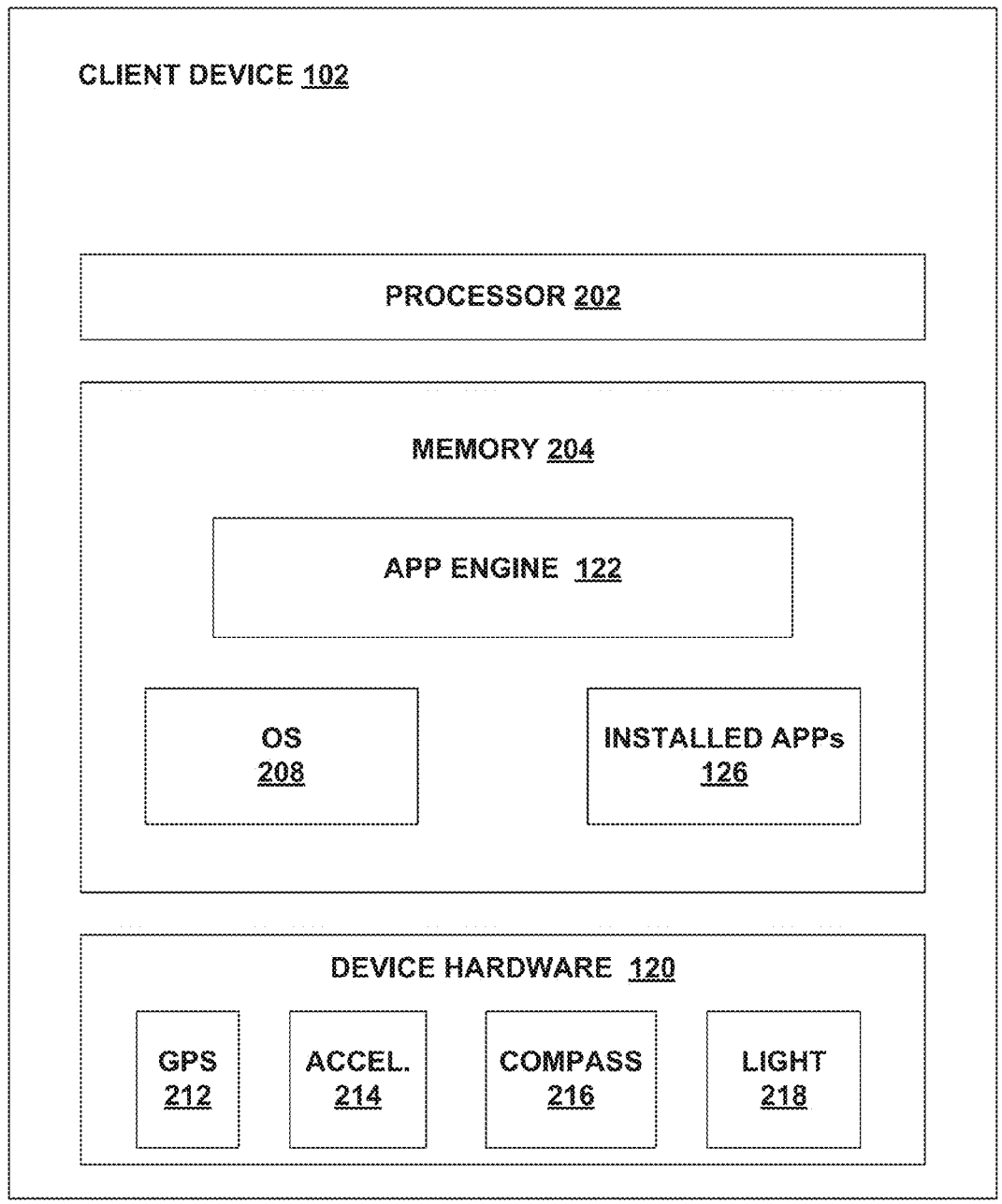
FIG. 2 is a block diagram of the arrangement of components of a client device configured for recommending applications to be installed, according to an example embodiment.

FIG. 2 is a block diagram of the arrangement of components of a client device configured for recommending applications to be installed, according to an example embodiment. As shown, client device 102 includes device hardware 120, a processor 202, and memory 204, among other components (not shown). The device hardware 120 includes, for example, a GPS module 212, an accelerometer 214, a compass 216, and a light sensor 218.

The memory 204 includes various applications that are executed by processor 202, including installed applications 126, an operating system 208, and app engine 122. For example, installed applications 126 may be downloaded and installed from an applications store.

As described, the app engine 122 is configured to upload context data, e.g., received from the device hardware, to database 108 and/or server 106. As described herein, the analytics engine 116 on the server 106 is configured to receive the context data and tag information 118 corresponding to the apps 112 and perform analysis to identify one or more applications to recommend to install on the client device 102.

Figure 3:
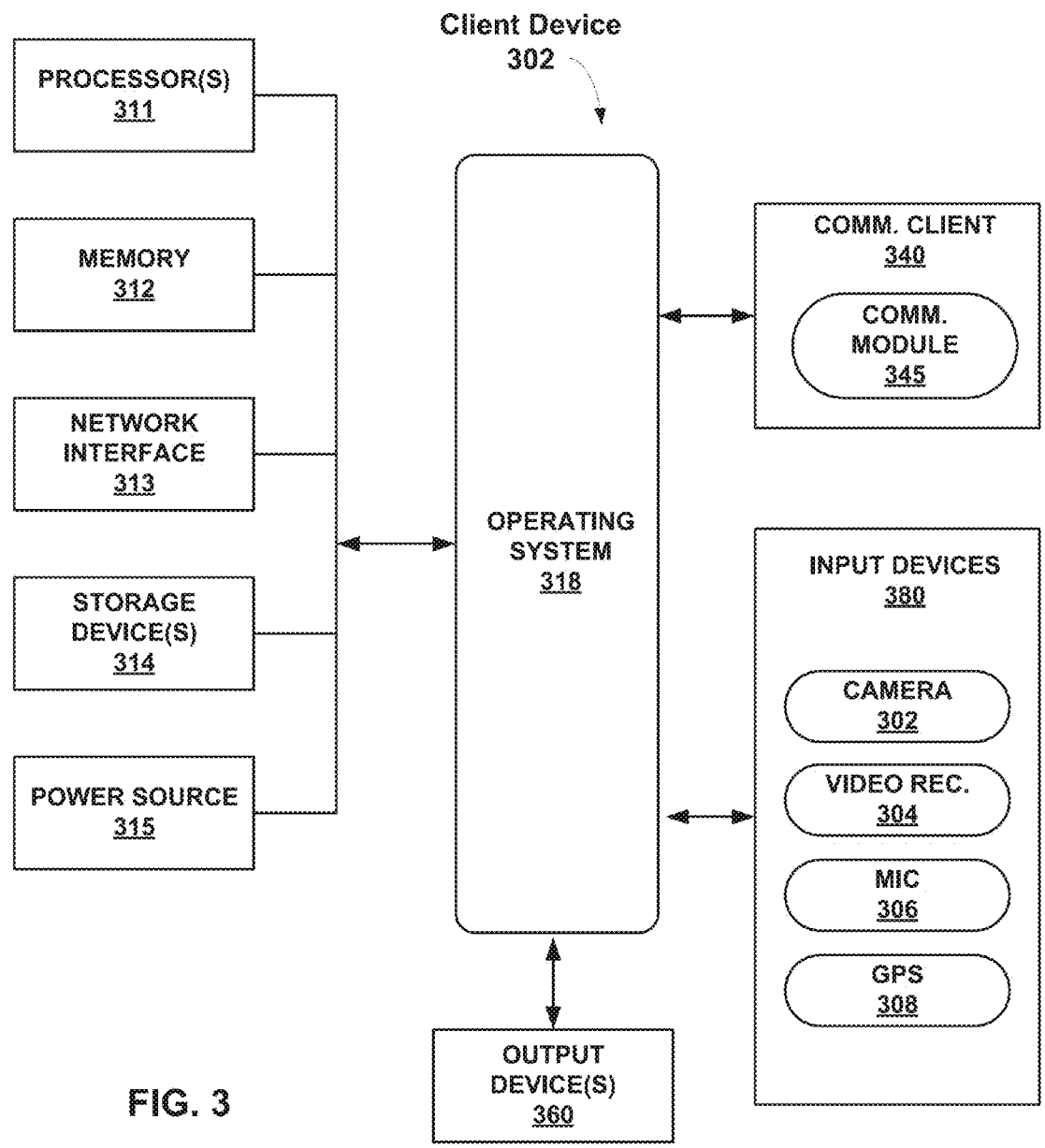
FIG. 3 is a block diagram of example functional components for a client device, according to an example embodiment.

FIG. 3 is a block diagram of example functional components for a client device 302, according to one embodiment. One particular example of client device 302 is illustrated. Many other embodiments of the client device 302 may be used. In the illustrated embodiment of FIG. 3, the client device 302 includes one or more processor(s) 311, memory 312, a network interface 313, one or more storage devices 314, a power source 315, output device(s) 360, and input device(s) 380. The client device 302 also includes an operating system 318 and a communications client 340 that are executable by the client. Each of components 311, 312, 313, 314, 315, 360, 380, 318, and 340 is interconnected physically, communicatively, and/or operatively for inter-component communications in any operative manner.

As illustrated, processor(s) 311 are configured to implement functionality and/or process instructions for execution within client device 302. For example, processor(s) 311 execute instructions stored in memory 312 or instructions stored on storage devices 314. Memory 312, which may be a non-transient, computer-readable storage medium, is configured to store information within client device 302 during operation. In some embodiments, memory 312 includes a temporary memory, area for information not to be maintained when the client device 302 is turned OFF. Examples of such temporary memory include volatile memories such as random access memories (RAM), dynamic random access memories (DRAM), and static random access memories (SRAM). Memory 312 maintains program instructions for execution by the processor(s) 311.

Storage devices 314 also include one or more non-transient computer-readable storage media. Storage devices 314 are generally configured to store larger amounts of information than memory 312. Storage devices 314 may further be configured for long-term storage of information. In some examples, storage devices 314 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The client device 302 uses network interface 313 to communicate with external devices via one or more networks, such server 106 and/or database 108 shown in FIG. 1. Network interface 313 may be a network interface card, such as an Ethernet card, an optical transceiver, a radio frequency transceiver, or any other type of device that can send and receive information. Other non-limiting examples of network interfaces include wireless network interface, Bluetooth®, 3G and WiFi® radios in mobile computing devices, and USB (Universal Serial Bus). In some embodiments, the client device 302 uses network interface 313 to wirelessly communicate with an external device, a mobile phone of another, or other networked computing device.

The client device 302 includes one or more input devices 380. Input devices 380 are configured to receive input from a user through tactile, audio, video, or other sensing feedback. Non-limiting examples of input devices 380 include a presence-sensitive screen, a mouse, a keyboard, a voice responsive system, camera 302, a video recorder 304, a microphone 306, a GPS module 308, or any other type of device for detecting a command from a user or sensing the environment. In some examples, a presence-sensitive screen includes a touch-sensitive screen.

One or more output devices 360 are also included in client device 302. Output devices 360 are configured to provide output to a user using tactile, audio, and/or video stimuli. Output devices 360 may include a display screen (part of the presence-sensitive screen), a sound card, a video graphics adapter card, or any other type of device for converting a signal into an appropriate form understandable to humans or machines. Additional examples of output device 360 include a speaker, a cathode ray tube (CRT) monitor, a liquid crystal display (LCD), or any other type of device that can generate intelligible output to a user. In some embodiments, a device may act as both an input device and an output device.

The client device 302 includes one or more power sources 315 to provide power to the client device 302. Non-limiting examples of power source 315 include single-use power sources, rechargeable power sources, and/or power sources developed from nickel-cadmium, lithium-ion, or other suitable material.

The client device 302 includes an operating system 318, such as the Android® operating system. The operating system 318 controls operations of the components of the client device 302. For example, the operating system 318 facilitates the interaction of communications client 340 with processors 311, memory 312, network interface 313, storage device(s) 314, input device 180, output device 160, and power source 315.

As also illustrated in FIG. 3, the client device 302 includes communications client 340. Communications client 340 includes communications module 345. Each of communications client 340 and communications module 345 includes program instructions and/or data that are executable by the client device 302. For example, in one embodiment, communications module 345 includes instructions causing the communications client 340 executing on the client device 302 to perform one or more of the operations and actions described in the present disclosure. In some embodiments, communications client 340 and/or communications module 345 form a part of operating system 318 executing on the client device 302.

Figure 4:
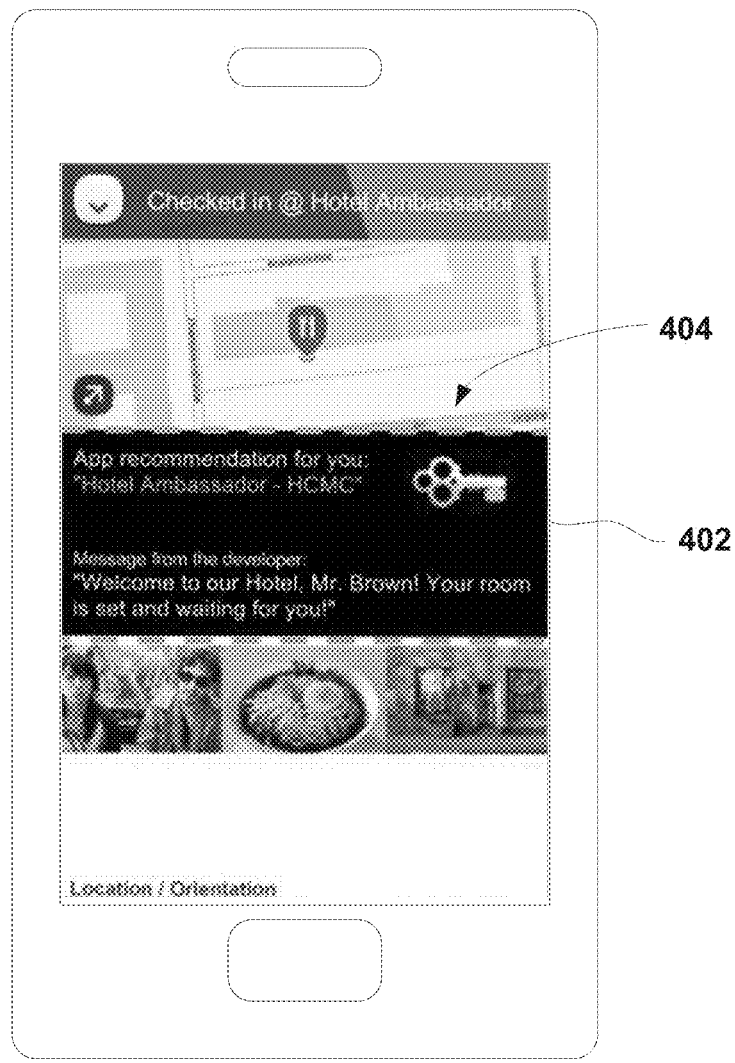
FIG. 4 is a conceptual diagram illustrating a user interface for displaying a prompt to install a recommended application, according to an example embodiment.

FIG. 4 is a conceptual diagram illustrating a user interface for displaying a prompt to install a recommended application, according to an example embodiment. As described above, in many cases, the usefulness of dedicated apps is limited to the situations and places in which such apps are meant to create value. As an example use case, a user walks into a particular hotel carrying a mobile phone, such as client device 102. The app engine 122 and device hardware 126 (e.g., GPS module) on the client device 102 detect that the user has entered the particular hotel. The app engine 122 transmits this information to database 108 for storage in the metadata 114 for the client device and/or user. According to various embodiments, the analytics engine 116 is configured to analyze the context data and/or metadata 114 relative to the tags 118 associated with apps 112 to identify recommended apps.

In the example shown, the analytics engine 116 detects a hotel app is available and transmits a signal to the app engine 122 to display a prompt 404 to the user to install the hotel app when the user is detected as checking into the hotel. The user may select a link 402 in the prompt to install the recommended app.

Figure 5A:
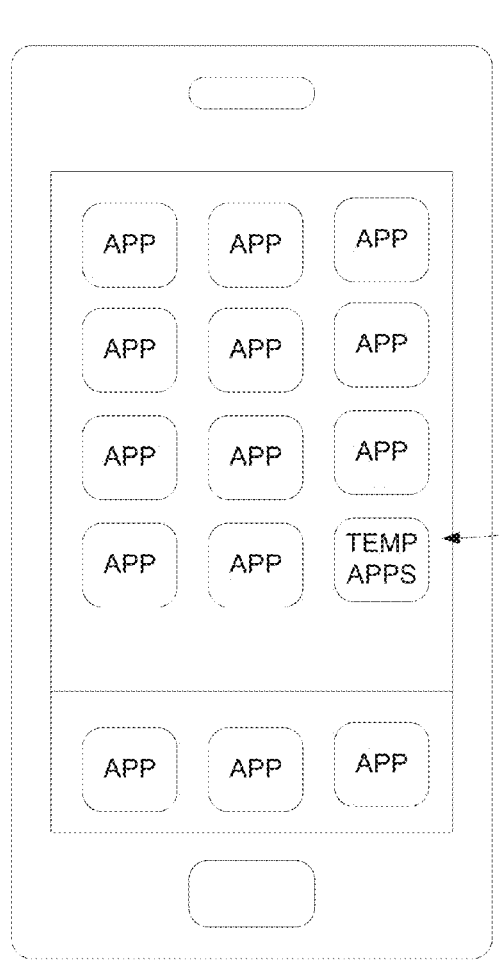
FIGS. 5A-5B are conceptual diagrams illustrating a user interface for displaying temporary apps, according to example embodiments.
Figure 5B:
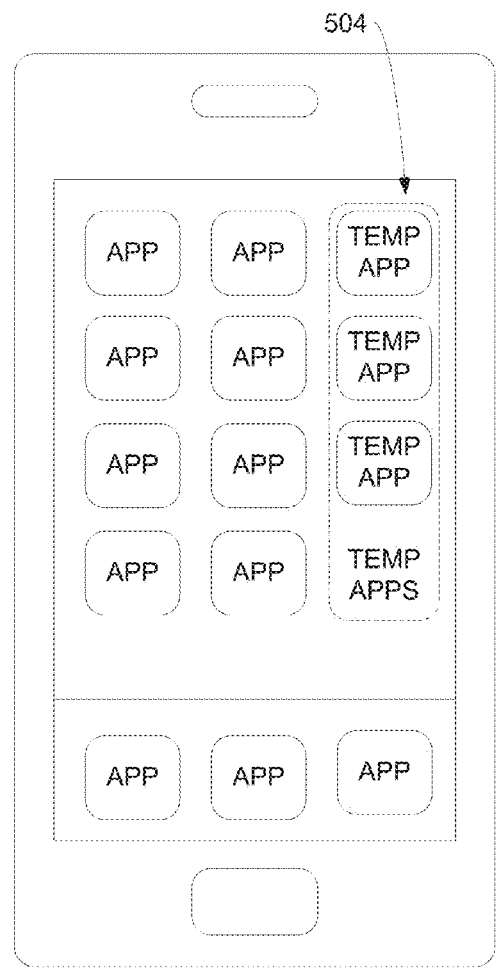

In other embodiments, rather than prompting the user install a recommended app, the recommended apps may be automatically installed and uninstalled based on relevance without user interaction. FIGS. 5A-5B are conceptual diagrams illustrating a user interface for displaying temporary apps, according to example embodiments. As shown in FIG. 5A, a separate icon 502 may be displayed on the client device corresponding to an area of the interface for accessing temporary apps. When the icon 502 is selected, the folder may expand to show the temporary apps, as shown by folder 504 in FIG. 5B.

As described, when an application is deemed relevant to the user content, the app may be automatically installed into the folder represented by icon 502. In one implementation, the signals used to determine when an app's utility is over are the same signals that indicated the app's utility. Once the match between the app's situational usefulness and the user's current context drops under a threshold for a given amount of time, the app engine 122 and/or the analytics engine 116 offers to uninstall the app. In various embodiments, the thresholds to install an app or delete an app may be the same or different. In some embodiments, the app is automatically uninstalled without prompting the user. Uninstalling the no-longer-relevant app can reduce clutter on the client device and free up resources on the client device.

In some implementations, the app engine 122 and/or the analytics engine 116 allow more control to the user to better suit privacy preferences. Examples of such controls includes: (i) a setting to limit the maximum number of temporary applications installed on the user's device at any given time, (ii) a setting to disable temporary app installs and instead present the user with a prompt with install requests, (iii) a setting to disable auto-deletion of installed temporary apps and instead present the user with a prompt to delete the app.

Various user interface (UI) implementations for temporary apps are within the scope of embodiments of the disclosure. Such UI differentiations could be conveyed through icon size, color variations, placement variations, grouping variations, icon highlighting, icon background highlighting, adding variations in app titles, among others. In one example, the icon 502 of the installed temporary apps could fade away when no temporary apps are installed.

Figure 6:
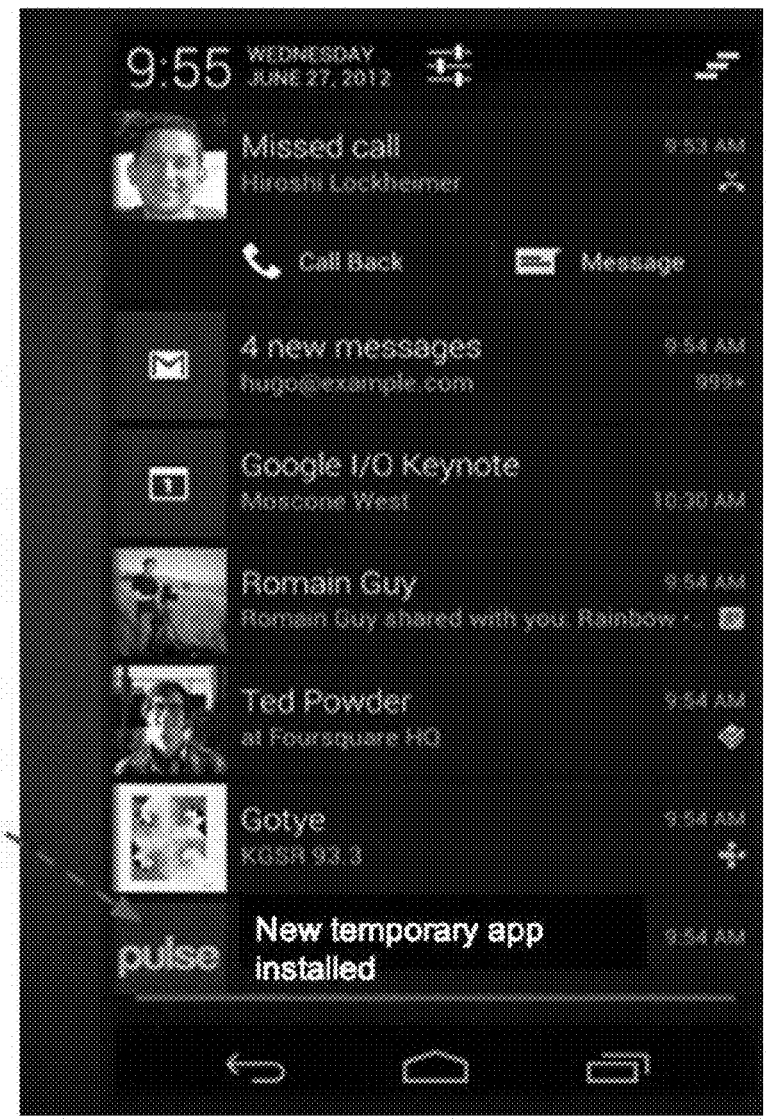
FIG. 6 is a conceptual diagram illustrating a user interface for displaying a notification that a temporary application has been installed, according to an example embodiment.

In another example, a notification can be provided in a notification feed that a new temporary application has been installed. FIG. 6 is a conceptual diagram illustrating a user interface for displaying a notification that a temporary application has been installed, according to an example embodiment. As shown, a notification item 602 corresponding to a newly installed temporary app is shown in a notification feed.

Figure 7:
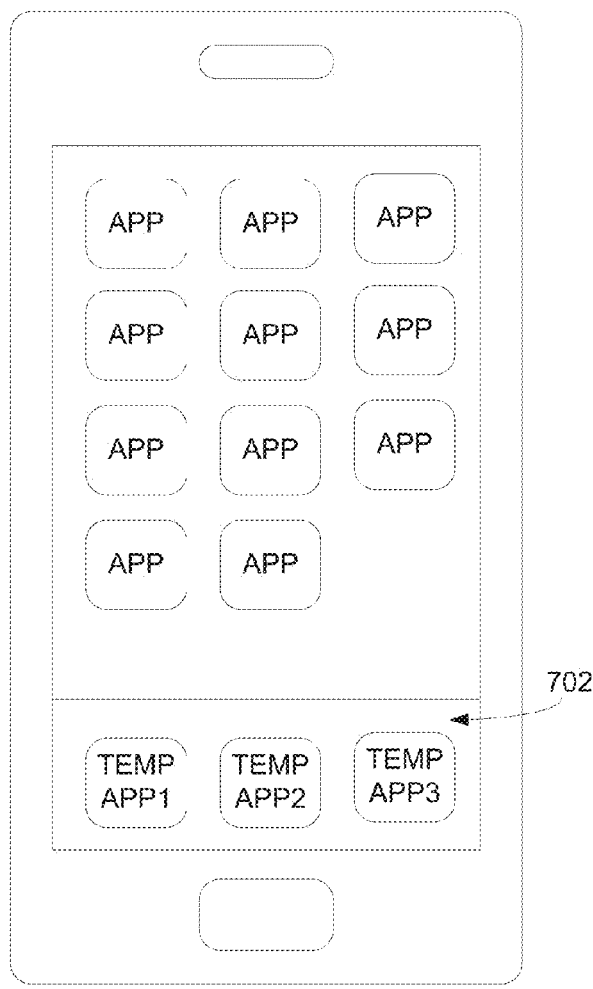
FIG. 7 is a conceptual diagram illustrating a user interface for displaying icons corresponding to temporary applications, according to an example embodiment.

In another example, the home screen of the client device has a dedicated area for temporary apps. FIG. 7 is a conceptual diagram illustrating a user interface for displaying icons corresponding to temporary applications, according to an example embodiment. As shown, the temporary applications are available in a dedicated area 702 of the home screen of the client device.

Figure 8:
FIG. 8 is a conceptual diagram illustrating a user interface for displaying icons corresponding to temporary applications with a custom background image, according to an example embodiment.

In yet another example, the home screen could have a dynamic background image that corresponds to the user's actual situation (e.g., at the airport). FIG. 8 is a conceptual diagram illustrating a user interface for displaying icons corresponding to temporary applications with a custom background image, according to an example embodiment. As shown, the temporary apps icons are placed above a background image 802. The background image 802 could be retrieved from a manually curated, cloud-based database or the background image 802 could be retrieved from the web using image search, where the search query is based on the actual events or the name of the places on which the app recommendations are based.

Figure 9:
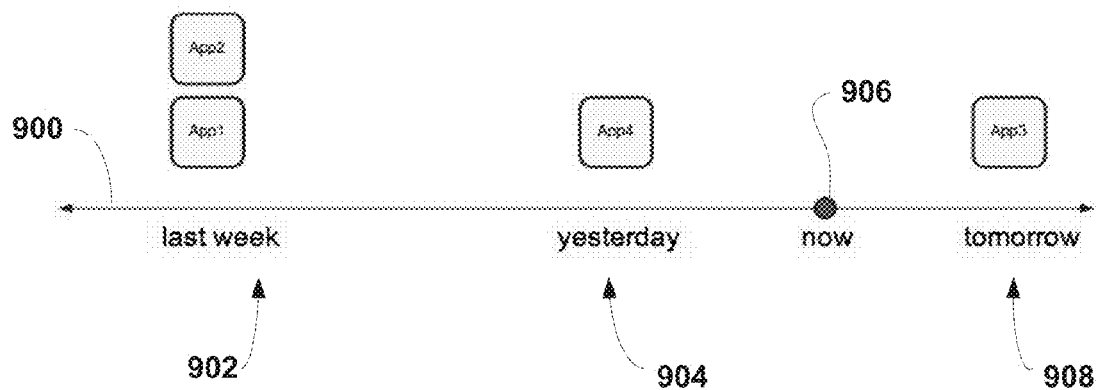
FIG. 9 is a conceptual diagram illustrating a timeline of recommended apps, according to an example embodiment.

As described above, some embodiments of disclosure provide a timeline of recommended apps, including past, present, and future recommended apps. FIG. 9 is a conceptual diagram illustrating a timeline 900 of recommended apps, according to an example embodiment. The timeline 900 includes an indicator 906 of the present time. The timeline illustrates apps that were recommended in the past 902, 904. The timeline illustrates apps that are expected to be recommended in the future 908.

The timeline 900 may be displayed on the client device by the user accessing an application installation settings screen. The recommended apps are placed on a timeline 900, which could be interactive or static. In an interactive version, the user has the option to "swipe" the timeline to see previously recommended apps. The apps may have been installed and then subsequently deleted. In one embodiment, the apps could be installed (or re-installed) directly from the timeline 900.

The timeline has a future section 908, which shows the apps that are predicted to be useful for the user's foreseeable future, for example, based on calendar data. In a different implementation of the timeline, the annotations (e.g., "now," "tomorrow," "last week") shown in the example in FIG. 9 could be replaced or accompanied by names of places or event names. For example: "at work," "at the concert," "at the airport." These labels could also originate from the user's calendar. In another example, the above described timeline could have a sharing feature, by which the user can share a snapshot of the recommended apps to other users (e.g., on social networks or by NFC tap).

In yet another embodiment, application recommendations may be coordinated with a promotion framework. In one example, app developers can be given the option for "paid inclusion," where a prompt (e.g., an ad) for their app is presented to users in situations where the users are most likely to buy and/or install the app. This feature provides a way for monetization of the application recommendation platform. In this embodiment, the app developers specify in which situations they want users to encounter ads for their apps. In other words, in an app ad campaign management system, app developers could set up rules to specify in which environments and conditions their app's install prompt should be shown to the user.

In some embodiments, sponsored apps could be differentiated from organically (non-sponsored) recommended apps by: the word "sponsored" overlaid on the launch icon, which also could be animated; a black and white version of the original launch icon, versus color for organic apps; a different (e.g., smaller) size of the standard launch icons; or a different shape (e.g., circle) version of the icon versus the standard (i.e., rounded square) launch icons.

In one implementation, the user has the option to allow sponsored apps or not allow sponsored apps (in an opt-in or opt-out way). In another implementation, the regular (organic or non-sponsored) apps could install automatically, while the sponsored ones could install only after prompting the user for permission. This prompt could also be presented to the user in a notification feed.

In yet another embodiment, the icons for already installed applications are arranged on the home screen such that the icons of the most useful app(s) become more prominent and accessible, while the icons of the less useful apps become less prominent or even hidden. In one implementation, a specific section within the home screen is kept for such dynamically changing launch icons. In another implementation, the launch icon of the most useful app(s) could be highlighted, marked, shown in an animated way, or increased in size. In one example, the above described signals could also be used for ranking and featuring apps in the app store.

Figure 10:
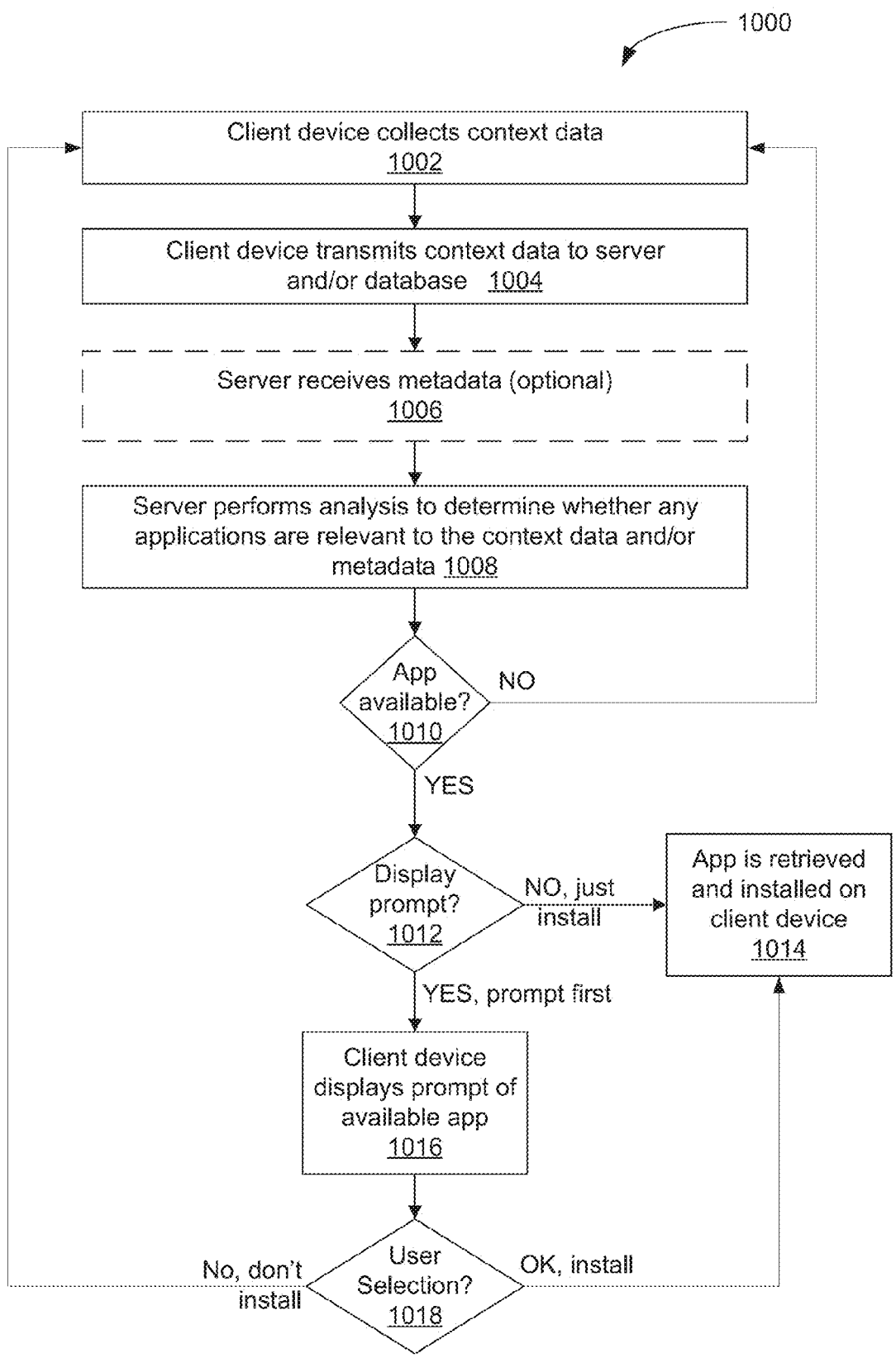
FIG. 10 is a flow diagram for installing an app on a client device, according to an example embodiment.

FIG. 10 is a flow diagram for installing an app on a client device, according to an example embodiment. Persons skilled in the art will understand that even though the method 1000 is described in conjunction with the systems of FIGS. 1-9, any system configured to perform the method stages is within the scope of embodiments of the disclosure.

As shown, the method 1000 begins at stage 1002, where a client device collects context data. The context data may be collected by device hardware 120 (e.g., GPS location information) or by a software application (e.g., search history from a browser application). In one embodiment, the client device is a mobile phone. At stage 1004, the client device transmits context data to a server and/or database.

At stage 1006, the server receives metadata from a database. As described above, the metadata may include additional data corresponding to the client device and/or the user of the client device. In some embodiments, stage 1006 is optional and is omitted (i.e., because the server has already received the data from the client device).

At stage 1008, the server, e.g., the analytics engine 116, performs analysis to determine whether any applications are relevant to the context data and/or metadata. According to various embodiments, the applications in an application store may be associated with tags. The analysis performed identifies a correlation between the context data and/or the metadata and the application tags to identify matches. In one embodiment, location information of the client device is used to identify location-specific apps relevant to the location of the client device. In another embodiment, location information of the client device in addition to other context data and/or metadata is used to identify an app relevant to the user and/or client device.

At stage 1010, the server determines whether any recommended apps are available. If the server determines no recommended apps are available, then the method 1000 returns to stage 1002, described above. If the server determines that at least one recommended app is available, then the method 1000 proceeds to stage 1012.

At stage 1012, the server determines whether a prompt to install the app should be presented on the client device or whether the app should be automatically installed. The decision as to whether to display a prompt about the available app may be configured by a user setting. If the server determines that the app should be automatically installed, then the method 1000 proceeds to stage 1014. At stage 1014, the client device retrieves the app from the app store and the app is installed.

If, at stage 1012, the server determines that a prompt to install the app should be presented on the client device, then the method 1000 proceeds to stage 1016. At stage 1016, the client device displays a prompt to install the available app. The prompt may be generated by a software application and/or OS executing on the client device. In one embodiment, the prompt is displayed based on the client device receiving a signal from the server to display the prompt.

At step 1018, a user selection in response to the prompt is received. If the user selection is to install the app, then the method proceeds to stage 1014, described above. If the user selection is to not install the app, then the app is not installed and the method 1000 returns to stage 1002. In some embodiments, once the user has declined to install a prompted app, that particular app is not again prompted to be installed for a minimum amount of time or, may never again be prompted to be installed based on a recommendation.

Figure 11:
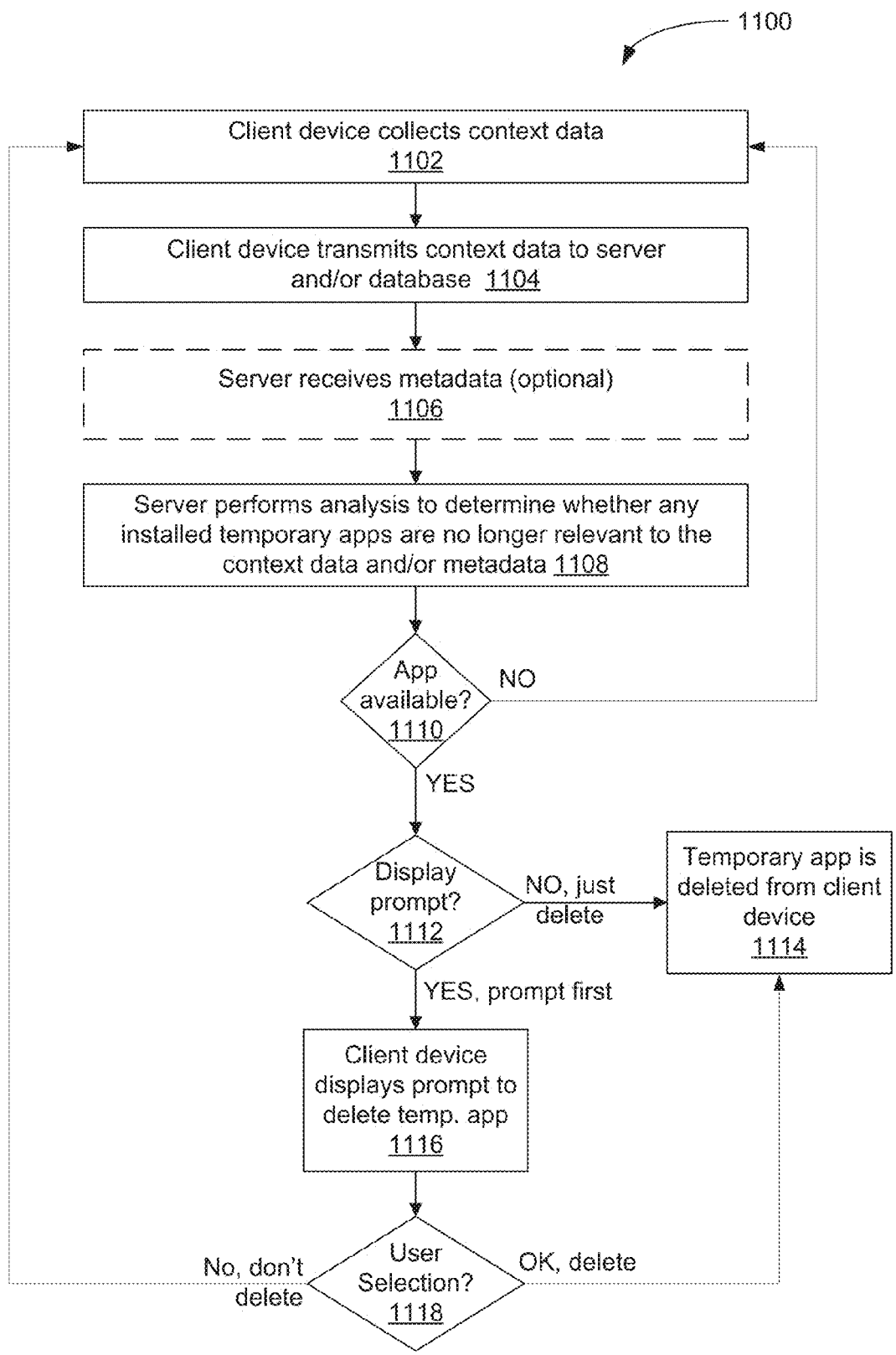
FIG. 11 is a flow diagram for deleting a temporary app from a client device, according to an example embodiment.

FIG. 11 is a flow diagram for deleting a temporary app from a client device, according to an example embodiment. Persons skilled in the art will understand that even though the method 1100 is described in conjunction with the systems of FIGS. 1-9, any system configured to perform the method stages is within the scope of embodiments of the disclosure.

As shown, the method 1100 begins at stage 1102, where a client device collects context data. The context data may be collected by device hardware 120 (e.g., GPS location information) or by a software application (e.g., search history from a browser application). In one embodiment, the client device is a mobile phone. At stage 1104, the client device transmits context data to a server and/or database.

At stage 1106, the server receives metadata from a database. As described above, the metadata may include additional data corresponding to the client device and/or the user of the client device. In some embodiments, stage 1106 is optional and is omitted (i.e., because the server has already received the data from the client device).

At stage 1108, the server, e.g., the analytics engine 116, performs analysis to determine whether any installed temporary applications are no longer relevant to the context data and/or metadata. According to various embodiments, a temporary application becomes no longer relevant when the tags associated with the application no longer correlate to the context data and/or metadata (e.g., for a threshold amount of time).

At stage 1110, the server determines whether any no longer relevant temporary apps are installed on the client device. If the server determines no such apps are installed, then the method 1100 returns to stage 1102, described above. If the server determines that at least one such app is installed, then the method 1100 proceeds to stage 1112.

At stage 1112, the server determines whether a prompt to delete the temporary app should be presented on the client device or whether the app should be automatically deleted. The decision as to whether to display a prompt about deleting the app may be configured by a user setting. If the server determines that the app should be automatically deleted, then the method 1100 proceeds to stage 1114. At stage 1114, the client device is deleted from the client device.

If, at stage 1112, the server determines that a prompt to delete the temporary app should be presented on the client device, then the method 1100 proceeds to stage 1116. At stage 1116, the client device displays a prompt to delete the temporary app. The prompt may be generated by a software application and/or OS executing on the client device. In one embodiment, the prompt is displayed based on the client device receiving a signal from the server to display the prompt.

At step 1118, a user selection in response to the prompt is received. If the user selection is to delete the app, then the method proceeds to stage 1114, described above. If the user selection is to not delete the app, then the app is not deleted and the method 1100 returns to stage 1102. In some embodiments, once the user has declined to delete a particular app in response to the prompt, that particular app is no longer prompted to be deleted for a minimum amount of time or, may never again be prompted to be deleted.

Advantageously, embodiments of the disclosure are able to draw the user's attention to particular apps that could cater to the user's real-time and customized needs. Embodiments of the disclosure also provide benefits to all players of the app ecosystem: developers get better discoverability of their apps, meaning more downloads and monetization, users get the apps they need, when they need them, leading to higher user satisfaction, and the app platform gets more traffic on platform and monetization as a result of happier developers and users.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising:
receiving, by a computing device, context data related to a mobile device;
assigning a situational utility score to one or more applications available in an application repository by analyzing the context data and tags associated with the one or more applications to determine which applications have situational usefulness, wherein the situational utility score is based on identifying one or more matches between the context data and the tags associated with the one or more applications;
responsive to determining that a situational utility score for a first application is greater than a first threshold value, sending an instruction to the mobile device to cause the mobile device to install the first application and display an icon associated with the first application in a first portion of a user interface of the mobile device, the first portion of the user interface being designated for temporarily-installed applications and being distinct from a second portion of the user interface for permanently-installed applications; and responsive to determining that the situational utility score for the first application is less than the first threshold value, sending an instruction to the mobile device to cause the mobile device to uninstall the first application.

2. The method according to claim 1, further comprising receiving a confirmation from the mobile device to allow the first application to be installed.

3. The method according to claim 1, wherein, after the first application is uninstalled, the icon associated with the first application is no longer displayed in the first portion of the user interface.

4. The method according to claim 1, wherein the context data is based on one or more of a location of the mobile device, calendar events, purchase history, applications recently used on the mobile device, and preference settings.

5. The method according to claim 1, further comprising sending an instruction to the mobile device to display a prompt on the mobile device to install a second application, wherein the second application has a situational utility score lower than the first threshold value.

6. The method according to claim 5, wherein the second application is a sponsored application.

7. The method according to claim 1, wherein the situational utility score is based on whether the application was previously selected to be installed when the situational utility score was greater than the first threshold on a previous occasion.

8. The method according to claim 1, further comprising:
if a second application has a situational utility score lower than a second threshold value and the second application is already installed on the mobile device, sending an instruction to the mobile device to display a prompt to uninstall the second application.

9. A method, comprising:
receiving, by a computing device, context data related to a mobile device;
assigning a situational utility score to one or more applications available in an application repository by analyzing the context data and tags associated with the one or more applications to determine which applications have situational usefulness, wherein the situational utility score is based on identifying one or more matches between the context data and the tags associated with the one or more applications;
determining that a situational utility score for a first application is greater than a first threshold value; and
sending an instruction to the mobile device to cause the mobile device to install the first application and display an icon associated with the first application in a first portion of a user interface of the mobile device, the first portion of the user interface being designated for temporarily-installed applications and being distinct from a second portion of the user interface for permanently-installed applications.

10. The method according to claim 9, further comprising:
determining that a situational utility score of a second application that is already installed on the mobile device is below a second threshold value; and
sending an instruction to the mobile device to cause the mobile device to uninstall the second application.

11. The method according to claim 10, wherein the first threshold value is the same as the second threshold value.

12. A system for managing applications on a mobile device, comprising:
a mobile device that includes a hardware component configured to detect a location of the mobile device and generate location data based on the location of the mobile device; and
a server in communication with the mobile device via a data network, the server configured to:
receive the location data from the mobile device,
identify that an application is available to be installed based on identifying a match between the location data and a tag associated with the application, and
cause a prompt to be displayed on the mobile device indicating that the application is available to be downloaded, wherein the application is downloaded and installed on the mobile device so that an icon associated with the application is displayed in a first portion of a user interface of the mobile device for temporarily-installed applications that is distinct from a second portion of the user interface for permanently-installed applications.

13. The system according to claim 12, wherein the application has a situational utility score greater than a first threshold value.

14. The system according to claim 12, wherein the application is installed on the mobile device in response to receiving a selection to install the application.

15. The system according to claim 12, wherein the application is subsequently uninstalled, and the icon is no longer displayed in the first portion of the user interface.

16. The system according to claim 12, wherein a prompt is displayed on the mobile device to uninstall a second application already installed on the mobile device if the second application has a situational utility score lower than a first threshold value.

17. The system according to claim 12, wherein a prompt is displayed on the mobile device to install a second application that has a situational utility score lower than a first threshold value.

18. The system according to claim 17, wherein the second application is a sponsored application.

19. The system according to claim 12, wherein the application is associated with a situational utility score that is based on whether the application was previously selected to be installed when the situational utility score was greater than a first threshold value on a previous occasion.

20. The system according to claim 19, wherein the situational utility score is based on one or more of the location of the mobile device, calendar events, purchase history, applications recently used on the mobile device, and preference settings.

* * * * *